Feb. 17, 1948.  W. E. PAKALA ET AL  2,436,324
IGNITRON FIRING CIRCUIT
Filed July 31, 1941  4 Sheets-Sheet 1

Fig. 1.

WITNESSES:

INVENTORS
William E. Pakala and
Henry C. Myers.
BY
ATTORNEY

Feb. 17, 1948.   W. E. PAKALA ET AL   2,436,324
IGNITRON FIRING CIRCUIT
Filed July 31, 1941   4 Sheets-Sheet 3

Fig. 3

WITNESSES:
Leon M. Garman
Thu. C. Groome

INVENTORS
William E. Pakala and
Henry C. Myers.
BY
S. A. Strickled
ATTORNEY

Patented Feb. 17, 1948

2,436,324

UNITED STATES PATENT OFFICE 2,436,324

IGNITRON FIRING CIRCUIT

William E. Pakala, Forest Hills, and Henry C. Myers, Irwin, Pa., assignors to Westinghouse Electric Corporation, East Pittsburgh, Pa., a corporation of Pennsylvania Application July 31, 1941, Serial No. 404,888

32 Claims. (Cl. 175—363)

Our invention relates to a vapor electric device, and particularly to an improved control system for make-alive-type converters.

The development of the make-alive type of mercury arc converter with its outstanding advantages and efficiency has introduced the need for a new type of excitation circuit. In a make-alive type converter, each valve contains an anode, a cathode and a make-alive electrode in permanent contact with the cathode. Each make-alive electrode requires a positive impulsive current once each cycle to start the arc at the beginning of the conducting period of the associated main anode.

In order to control the output potential of the converter, it must be possible to adjust the phase position of these impulses with respect to the supply potential. Although the instantaneous current and power of the impulses are quite high, the impulse duration is preferably such that the average power is low and does not seriously affect the efficiency of the converter.

The wave shape of the make-alive impulse is not critical in so far as creating a cathode spot is involved if sufficient power and amplitude are supplied but the size and efficiency of the excitation equipment and the operating characteristics of the make-alive valve vary greatly with the impulse wave form. The value of power required for reliable pickup varies greatly with the time rate of rise and duration of make-alive current. Further for a given rate of rise, the potential at which a cathode spot is formed varies somewhat from cycle to cycle depending upon various conditions in the valve. This, of course, influences the time of pickup of the main anode so that for practical reasons the impulses must be steep enough so that such variations in pickup have a negligible effect on the operation of the valve. In theory this requires an impulse having a perpendicular front with a flat top and persisting only until the cathode spot is initiated. In practice it is desired to produce an impulse approximating this ideal impulse.

Heretofore many systems have been devised for applying these make-alive impulses to the make-alive electrodes. Rotating contactors furnishing unidirectional current from any suitable source have been utilized but are unsatisfactory because of the necessity for constant maintenance of the contact points. Also, various types of impulse generators have been developed for supplying the necessary steep wave fronts for securing proper timing of the initiation of the cathode spots. However, the disadvantage of having a rotating device has militated against the impulse generators.

Peaking transformers have also been considered, but the cost and size of such transformers have restrained their commercial use. The most general method heretofore used has been the use of auxiliary valves of various types for applying a control potential either directly or indirectly to the make-alive electrode, the potential for the auxiliary valves being taken either from the associated main anode or from some suitable auxiliary source of potential. While the use of auxiliary valves has the advantage of accuracy and flexibility of control, the cost of the valves and the necessary replacement thereof has been a commercial disadvantage.

Many of the disadvantages of these heretofore known excitation systems were eliminated by the discovery that saturable reactors could be utilized to supply the make-alive impulses to the make-alive electrodes. See copending application Serial No. 346,287, filed July 19, 1940, now Patent No. 2,401,013, issued May 28, 1946, and assigned to the same assignee.

It is the object of our invention to provide a wave distorter system utilizing non-linear inductances such as saturable reactors for providing control impulses and to associate the wave distorter systems with a control circuit having a greatly increased economy in construction and operation as well as maximum reliability and ease of control.

According to our invention, each control circuit device energizes the make-alive electrodes of a pair of make-alive valves connected to a source of potential such that the valves are alternately conductive 180° apart electrically. In order to increase the efficiency of the control circuit and reduce the number and cost of the control elements, each control circuit is so connected to a pair of make-alive electrodes that the alternate half cycles of control potential are properly utilized for controlling the respective make-alive valves. This is accomplished by providing a suitable energy storing device such as a capacitor for storing the make-alive energy from any suitable alternating current source and controlling the discharge of the capacitor by means of a non-linear inductance, the storage capacitor being connected to the two make-alive electrodes in series relationship, and suitable shunts or unidirectional conductors being provided for shunting alternate half cycles or alternate impulses around one or the other of the make-alive electrodes, so that the make-alive electrodes are alternately energized by substantially the full discharge of the capacitor.

It is accordingly, an object of our invention to provide a high efficiency control system for a pair of make-alive devices.

It is a further object of our invention to provide a control system in which a pair of make-alive electrodes are alternately energized by the same control equipment.

It is a further object of our invention to provide a control circuit for producing control impulses for a pair of make-alive type valves.

It is a further object of our invention to provide a wave distorter circuit or wave shape transformer for transforming ordinary alternating current into impulses of shorter duration and greater amplitude.

It is a further object of our invention to provide a voltage compensating network for maintaining a substantially constant potential supply to a wave distorter system.

Other objects and advantages of our invention will be apparent from the following detailed description taken in conjunction with the accompanying drawings, in which.

Figure 1:
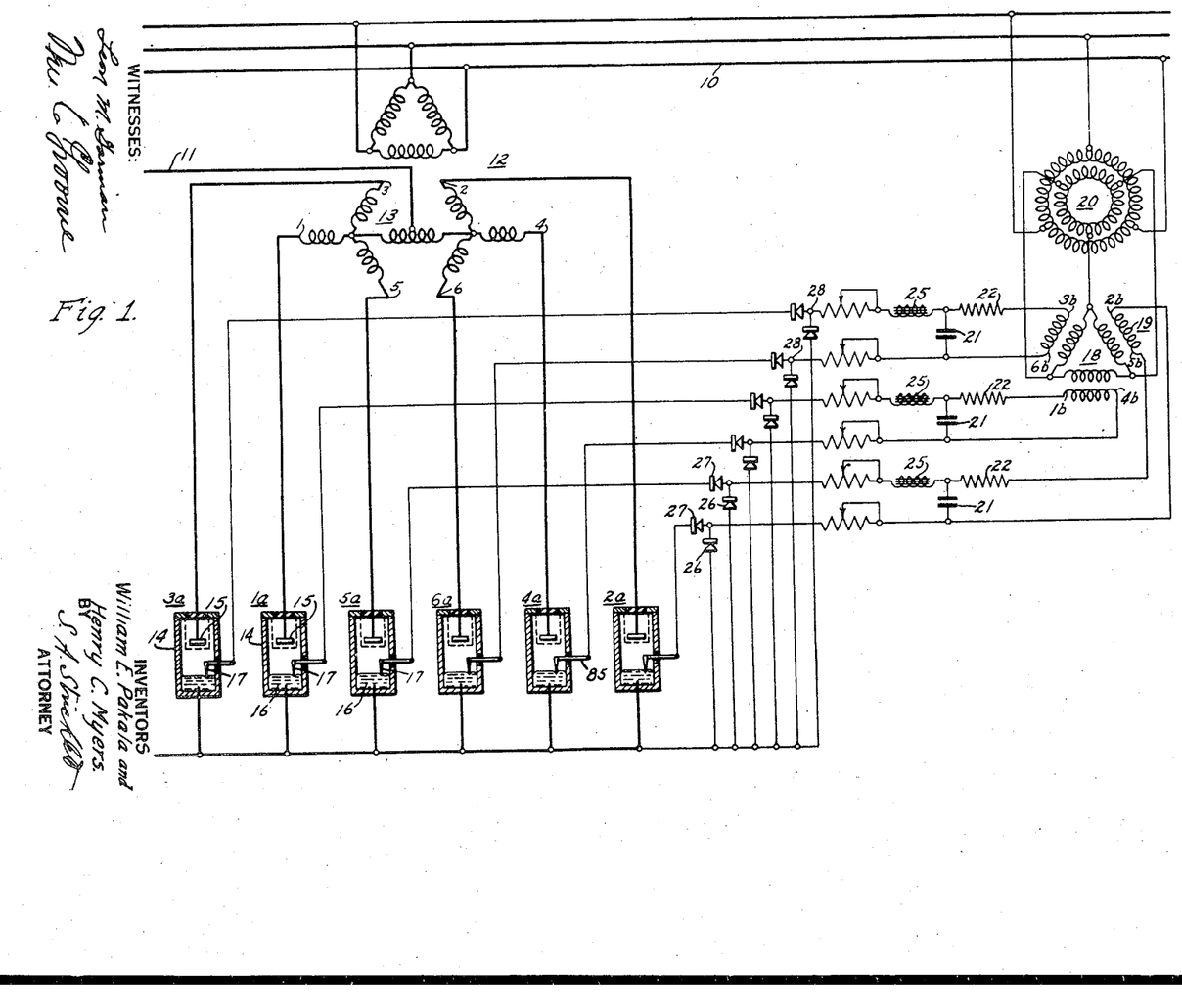
Figure 1 is a schematic illustration of a vapor electric device utilizing a simplified control system according to our invention.

In the illustrative embodiment of our invention, according to Fig. 1, an alternating current circuit 10 is connected to a direct-current circuit 11 by means of a suitable rectifier-transformer 12. The windings 13 of the main transformer 12 are so connected as to provide a plurality of phase terminals 1 to 6 having pairs of oppositely disposed phase terminals such as 1—4, 3—6, 2—5 which are preferably separated or displaced from each other by 180 electrical degrees, so that the potentials of each pair is of opposed polarity. Make-alive type valves 1a to 6a are connected between each of the phase terminals 1 to 6 and one side of the direct-current circuit 11 for controlling the flow of electrical energy between the circuits 10 and 11, the pair of valves connected to a given pair of phase terminals being alternately conducting. Each valve comprises a container 14 in which is placed an anode 15, a cathode 16 and a make-alive electrode 17 normally in permanent contact with the cathode 16.

Control potential is taken from any suitable source, such as the alternating current circuit 10, and suitable means such as a transformer 18 is provided for producing a plurality of substantially independent control windings 19 corresponding in number to the pairs of phase terminals produced by the rectifier transformer 12 and having terminals 1b to 6b corresponding to main terminals 1 to 6.

Suitable phase shifting means 20 are preferably provided for shifting the phase of the control potentials as desired. Each of the substantially independent control windings 19 is connected to one of the pairs of valves associated with the oppositely disposed phase terminals of the converter transformer 12. Each control circuit comprises a capacitor 21 connected in shunt with a control winding 19 and has a suitable impedance preferably in the form of a resistor or a linear reactor 22 connected between the control winding 19 and the capacitor 21 for controlling current flow between the winding 19 and the capacitor 21. The opposite sides of the capacitor 21 are connected to the make-alive electrodes 17 in a pair of valves so that the electrodes 17 are connected in series opposition across the capacitor 21 by means of a common cathode connection 11 of all of the valves 1a to 6a.

A non-linear inductance such as a saturating reactor 25 is connected in the series circuit including the capacitor 21 and the series connected make-alive electrodes 17. The saturating reactor 25 produces sharply peaked impulses of alternating polarity which are supplied to the make-alive electrodes 17.

The saturating reactors 25 are preferably constructed of a coil of wire wound on a core of a material having a high magnetic permeability and a sharp saturation point. The core is preferably constructed of a ribbon of highly permeable steel (such as specially heat-treated nickel steel or specially treated high silicon steel such as are at present sold under the trade-marks of "Hipersil" or "Hipernik"), wound flatwise into a core having a minimum air gap. On the other hand, the linear reactors 22 have cores constructed of laminations of ordinary grade transformer iron and preferably have suitable air gaps therein.

However, it is undesirable to allow inverse potential to flow through a make-alive electrode and for this reason we have connected suitable rectifier elements or unidirectional conducting devices 26 between the cathodes 16 and the opposite sides of the control circuits, the rectifier elements 26 being conductive from the cathode 16 to the side of the circuit connected to the terminal of the make-alive electrode 17. By this means, the potential from one side of the capacitor 21 will flow through a make-alive electrode 17 and be by-passed around the series connected make-alive electrode 17 so that the series connected electrode does not carry the inverse current. Likewise, on the inverse half cycle the alternate make-alive electrode 17 will be energized in the same manner.

We also prefer to provide unidirectional conductors or rectifier devices 27 in series with the make-alive electrodes 17 to further reduce the flow of inverse potential through the alternate make-alive electrodes. These shunt-series rectifier elements 26—27 provide a local circuit in which a plurality of unidirectional conductors or rectifier elements are connected in a conducting relation between the common cathode connection 16, and each of the make-alive electrodes 17, and having the capacitor connection 28 made intermediate the rectifier elements 26 and 27.

We have found that in use, the rectifier devices, particularly those of the copper oxide variety, have a tendency to age or change their characteristics and, therefore, we have provided a compensating or balancing impedance preferably in the form of a variable resistor 29 connected between the capacitor 21 and the rectifier elements 26—27. The balancing resistors 29 not only compensate for changing characteristics of the unidirectional conductors but can balance out any inequalities in resistance of the control circuits so that all circuits have more nearly identical characteristics.

Figure 4:
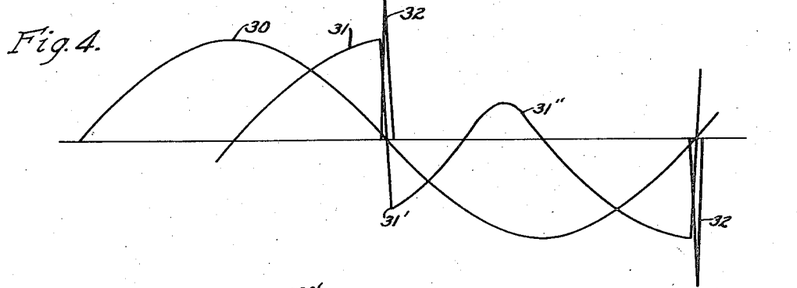
Fig. 4 is a diagrammatic illustration of the voltage and current relations for the control system according to our invention.

In the operation of our conversion system, the potential 30 of a control winding 19 such as the winding 19 having the terminals 1b and 4b is applied to the associated capacitor 21 of the wave distorter circuit through the impedance 22 which controls the flow of current between the winding 19 and the capacitor 21. Assuming the terminal 1b to be positive as indicated in Fig. 4, then the potential 30 will force a current through impedance 22 to place a potential or charge 31 on the capacitor 21 so that the top side of capacitor 21 is positive. When the current reaches the critical value, the non-linear reactor 25 will saturate allowing a pulse of current 32 to flow through the series rectifier element 27 and the make-alive electrode 17 of valve 1a to initiate a cathode spot in valve 1a, the return current flowing to the opposite side of capacitor 21 through the rectifier element 26 in shunt with the make-alive electrode 17 in valve 4a.

The capacitor potential 31, because of the high reactive circuit, falls to a value 31' lower than the charging potential 30 and, therefore, tends to fluctuate, as shown by the section 31'—31'' of the capacitor potential 31. The circuit constants must be such that these fluctuations will not resaturate the saturable reactor 25. The capacitor 21 will then charge up in the opposite polarity and be discharged through the alternate make-alive electrode 17 in the valve 4a as described.

Figure 2:
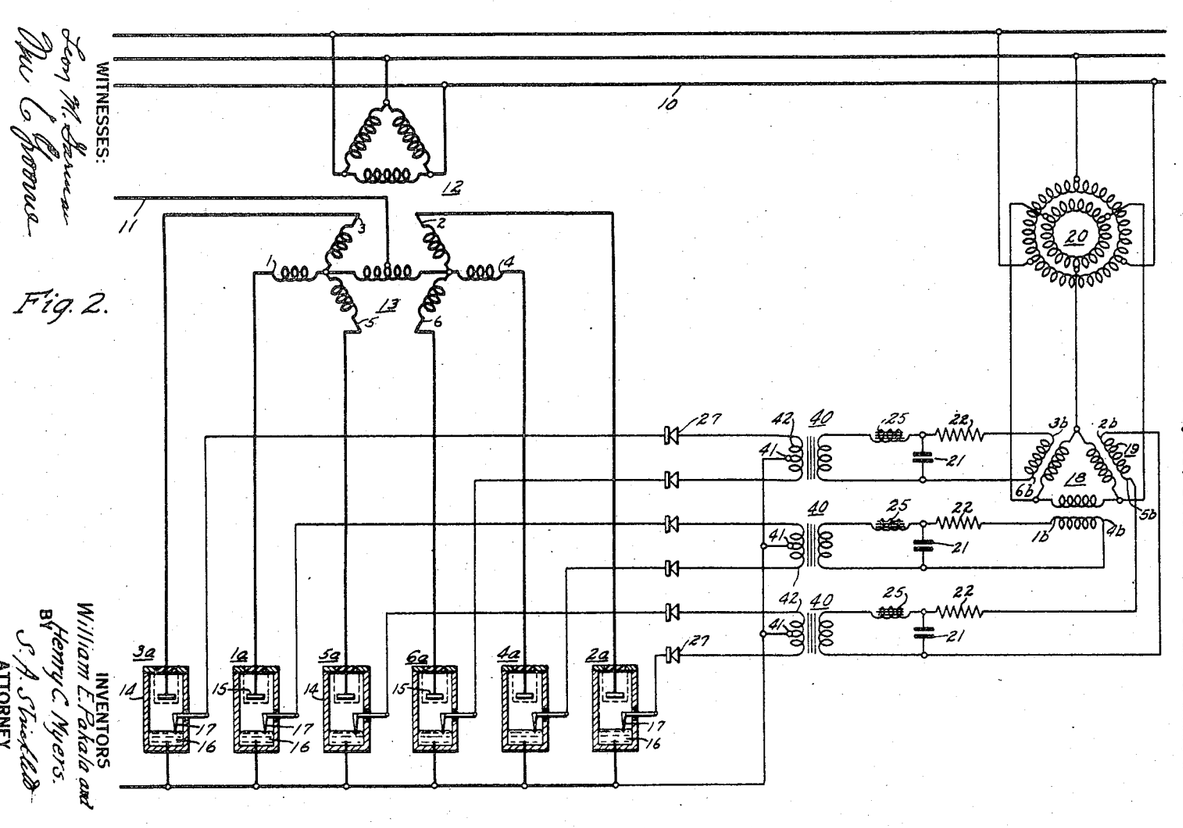
Fig. 2 is a similar illustration of a modification according to our invention.

In the modifications of our invention, according to Fig. 2, a suitable transformer 40 has been interposed between the capacitor 21 and the make-alive electrodes 17, so that the potential applied to the make-alives 17 may be different than that produced by the controlling capacitor 21. Also when transformers are utilized between the capacitor 21 and the make-alive electrodes 17, a suitable mid tap 41 may be provided in the secondary 42 of the transformer 40 without materially reducing the efficiency of the control circuit and thereby eliminating the necessity for the return or shunt rectifier devices 26.

Figure 5:
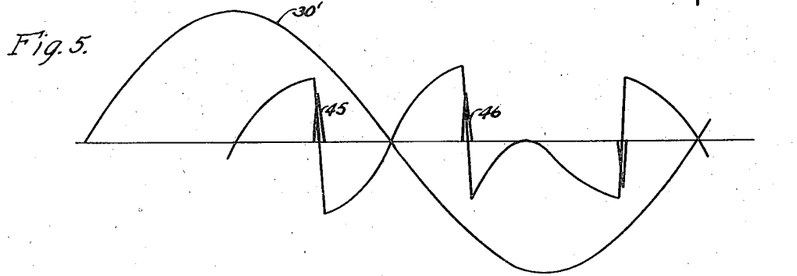
Fig. 5 is a similar view showing current and voltage relations produced by an undesirable voltage supply condition.

In operation, it has been found that a substantially constant potential on the wave distorter circuit is necessary in order to produce accurate control of the make-alive operation. For instance, if the control potential 30' should materially increase, as shown in Fig. 5, the capacitor 21 will receive its full charge prematurely so that the saturating reactor 25 will be saturated and produce a premature impulse 45, and frequently for the same reason the capacitor 21 will fluctuate to a potential sufficient to produce a second peak 46 or a so-called "double peaking" condition, neither of the peaks 45 or 46 being properly timed to control the operation of the converter.

Figure 3:
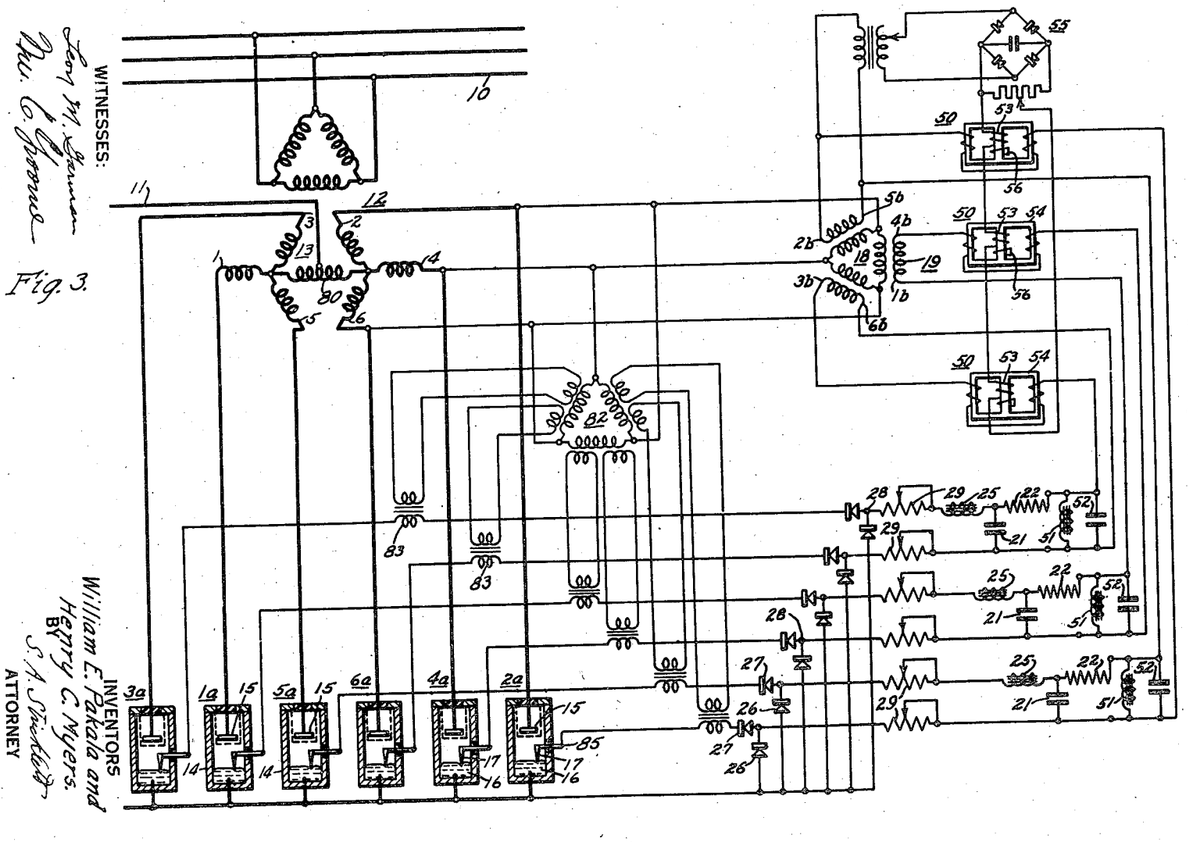
Fig. 3 is a further embodiment according to our invention.

To eliminate this condition, we have provided a constant potential network between the source of control potential and the wave shape transforming apparatus. This constant potential network comprises a suitable reactor 50, preferably of the non-linear or saturable variety, in series with the control potential, a second saturable reactor 51 in shunt with the control potential, and a suitable capacitor 52 in shunt with the second saturable reactor 51.

By suitably varying the reactance of the nonlinear reactor 50, the phase angle of the control potential may be shifted, thus providing a method of eliminating the inductive phase shifter 20. We prefer to control the reactance of the saturating reactor 50 by placing an auxiliary winding 53 on the core 54 of reactor 50 and applying a variable direct current biasing potential from any suitable source such as the rectifier 55 which is supplied from any convenient source herein illustrated as the control winding 19.

The reactor 50 is preferably provided with a three legged core 54 of the saturable type and the inductance made variable by a saturating winding 53 placed on one of the legs. A short circuited winding 56 is also placed on the leg bearing coil 53 to damp out the alternating flux which would otherwise traverse that leg and generate an alternating potential in the biasing winding 53.

Figure 6:
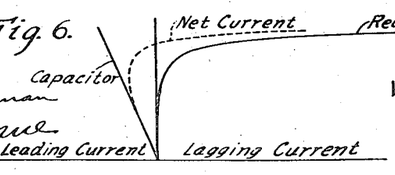
Fig. 6 is a diagrammatic illustration of current and voltage conditions in a constant potential network according to our invention.
Figure 7:
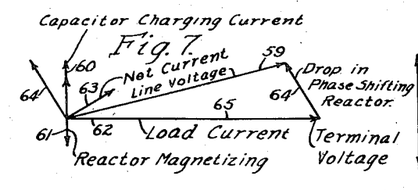
Figs. 7 and 8 are, respectively, vector diagrams illustrating the correcting method for high and low voltage condition in the supply circuit.
Figure 8:
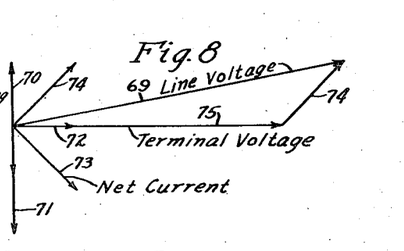

The operation of the constant potential network will be better understood from an examination of Figs. 6 to 8 of the drawings. The constant potential network draws a larger load current than the firing circuit alone but in turn acts as a source of power for the firing circuit.

Fig. 6 shows a typical current curve for the reactor 51 and the capacitor 52 and a net current curve for both in parallel. The parallel combination of capacitor 52 and reactor 51 is preferably designed so that at 100% supply voltage, the combination will draw the minimum of current. If the voltage 59 of winding 19 is low, then as shown in Fig. 7, the capacitor 52 draws a charging current 60 in excess of the magnetizing current 61 of reactor 51, this in conjunction with the load current 62 causes a leading current 63 to be drawn through the phase shifting reactor 50 thus causing a drop 64 for maintaining substantially full voltage supply 65 to the wave distorter circuit. On the other hand, if the voltage 69 of the source 19 is high as shown in Fig. 8, then the saturating reactor 51 draws a magnetizing current 71 in excess of the charging current 70 drawn by the capacitor 52 which in conjunction with the load current 72 causes a lagging current 73 to be drawn through the reactor 50, thus causing a drop 74 which maintains the voltage 75 at the wave distorter circuit substantially constant.

In practical operation, this permits a 90° phase shift with no appreciable change in peak voltage output. The line voltage may likewise change 30% with only a 1% change in the terminal voltage applied to the firing circuit.

Otherwise the control operation is identical with that in Fig. 1, except that it is no longer necessary to connect to a constant source of control potential and any available source such as the anode terminals, may be utilized as a source of control potential even though the terminal voltage of the rectifier transformer 12 will be variable under different load conditions.

Figure 9:
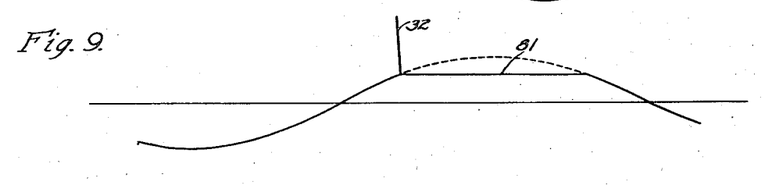
Fig. 9 is an illustration of the excitation conditions met with during certain low load operations.

In certain low load conditions, a difficulty has been experienced, because the load current is not sufficient to actuate the interphase transformer 80 of the rectifier transformer 12, and consequently the converter instead of acting as double three-phase will act as 6 phase diametrical, and, therefore, the timing of the impulses 32 is incorrect to produce the relatively short current carrying periods of the 6-phase diametrical operation.

As shown in Fig. 9, the firing impulse 32 will take place at the usual double three-phase firing position, but the rectifier will not carry current until much later in the cycle, and, therefore, it is desirable to provide holdover means for maintaining an exciting current 81 until the period in the cycle when the converter will carry a momentary impulse of current. We have accomplished this by providing an auxiliary source of excitation potential 82 and providing transformer means 83 linked with the local circuits involving each make-alive electrode 17 and its series shunt rectifier elements 26—27 so that the auxiliary potential is applied to the local circuit. The auxiliary potential of the source 82 is preferably of a value low enough so that in and of itself it will not produce sufficient current to initiate a cathode spot. However, when the control reactor 25 operates to discharge the capacitor 21 and initiate the cathode spot, the auxiliary potential should be sufficiently high to maintain an excitation arc from the holder 85 of the make-alive electrode 17 and supply the arc drops of the various rectifier elements 26—27 connected in conductive relation between the cathode connection 16 and the make-alive electrode 17.

In operation, the potential of the auxiliary source 82 is in phase with the potentials of the main transformer 12. However, the potential applied to the make-alive electrode 17 is not sufficient to initiate the make-alive action but when the saturable reactor 25 saturates and passes the impulse 32 to the make-alive electrode 17, the potential of the auxiliary source is sufficient to establish an arc from the holder 85 of the make-alive electrode 17 and supply the keep alive current 81 for a major portion of the positive half cycle so that the main anode 15 can pick up and carry current after the termination of the make-alive impulse 32.

While for purposes of description we have shown and described a specific embodiment of our invention, it will be apparent that changes and modifications can be made therein without departing from the true spirit of our invention or the scope of the appended claims.

We claim as our invention:

1. In a conversion system having a plurality of electric valves each valve including a main anode, cathode and a make-alive electrode in contact with the cathode, a control system comprising a source of alternating control potential, transformer means for providing an electrically insulated secondary phase winding for each pair of said valves, a saturable reactor and a capacitor connected across each of said windings, a saturable reactor in series between said winding and said parallel reactor and capacitor, an auxiliary winding on said series connected saturable reactor, means for impressing a direct current on said auxiliary winding, an impulsing circuit connected to said winding through the said series saturable reactor and said parallel saturable reactor and capacitor and means for energizing alternate ones of a pair of make-alive electrodes from said impulsing circuit.

2. In a vapor-electric converter, a main polyphase transformer providing a plurality of pairs of phase terminals separated by 180 electrical degrees, a make-alive-type valve connected to each of said phase terminals, a common cathode connection for all of said valves, a make-alive electrode in each of said valves, a source of polyphase control-potential, phase-shifting means for controlling said polyphase control-potential, auxiliary transformer-means energized from said controlled polyphase control-potential for providing a plurality of electrically insulated secondary phase-windings corresponding to said pairs of phase terminals, a capacitor connected across each of said secondary phase windings, reactors connected between the secondary phase windings and the respective capacitors, means for connecting the opposite sides of the respective capacitors to the make-alive electrodes of the valves connected to corresponding pairs of phase terminals and a non-linear inductance for controlling the flow of current from said capacitor to said make-alive electrodes.

3. In a vapor electric converter comprising a pair of alternately conducting make-alive type valves, a control circuit comprising a source of alternating control potential, a phase-shifting circuit including a variable reactor connected in series with the output of said source, a reactor and a capacitor connected across said source and said variable reactor, means for varying the reactance of said variable reactor to shift the phase, a wave distorter circuit fed by said source through said phase-shifting circuit, a make-alive electrode in each of said valves and means for selectively energizing said make-alive electrodes from the output of said wave distorter circuit.

4. In an electric current conversion system for transferring electric energy between a polyphase alternating current circuit and a direct current circuit comprising a polyphase rectifier transformer providing a plurality of pairs of phase terminals, the terminals of each pair of terminals being separated 180° electrically, a main valve of the make-alive type connected to each of said phase terminals, a source of polyphase control potential, auxiliary transformer means providing electrically insulated secondary phase windings corresponding to the pairs of phase terminals of said rectifier transformer, a plurality of wave distorter circuits connected to the respective secondary phase windings, each wave distorter circuit including a capacitor connected in shunt with the phase winding, an impedance between the phase winding and the associated capacitor, polarity responsive circuit means for connecting the make-alive electrodes of two valves connected to a pair of phase terminals in opposition across the capacitor and a non-linear reactor in series with the pair of make-alive electrodes to control current flow from said capacitor to said pair of electrodes.

5. A control circuit for controlling a pair of make-alive type valves connected 180 electrical degrees apart comprising a make-alive electrode in each of the valves, a source of alternating current control potential, a capacitor connected across said source of potential, an impedance for controlling current flow from said source to said capacitor, a common cathode connection for said valves, means including said common cathode connection for connecting said make-alive electrodes in series across said capacitor, a non-linear reactor in series between said capacitor and said make-alive electrodes, a unidirectional conductor in series with each make-alive electrode, a second and oppositely disposed unidirectional conductor in shunt with said make-alive electrode and said first mentioned unidirectional conductor, an auxiliary source of potential and transformer means for supplying potential from said auxiliary source to the local circuits involving the make-alive electrode and its series-shunt unidirectional conductors.

6. In an electric current conversion system comprising a plurality of pairs of make-alive type valves, the individual valves of each pair being alternately conducting, a make-alive electrode in each of said valves, a source of alternating control potential, means for providing a substantially independent control winding for each pair of valves, a combination phase-shifter constant-voltage network for each of said control windings, said network including a non-linear inductance and a capacitance connected in parallel across said winding, a variable inductance connected in series between said winding and said parallel inductance and capacitance, a wave-shape-transforming circuit supplied from said winding through said network and means for alternately energizing the make-alive electrode of a pair of valves from said wave-shape-transforming circuit.

7. In a make-alive type converter having a supply transformer and at least a pair of make-alive-type valves connected to opposed phase terminals of said transformer, a control system comprising a make-alive electrode in each of said valves a source of alternating make-alive potential, a capacitor charged from said source, a linear reactor for controlling the flow of current to said capacitor, means for connecting said make-alive electrode in series across said capacitor, a saturating reactor for controlling the flow of current from said capacitor through said make-alive electrode, a unidirectional conductor in series with each of said make-alive electrodes and an oppositely directed unidirectional conductor in shunt with each make-alive electrode and its associated series unidirectional conductor.

8. In an electric current conversion system for transferring electric energy between a polyphase alternating current circuit and a direct current circuit comprising a polyphase rectifier transformer providing a plurality of pairs of phase terminals, the terminals of each pair of terminals being separated 180° electrically, a make-alive type valve connected to each of said phase terminals, a source of polyphase control potential, auxiliary transformer means providing electrically insulated secondary phase-windings corresponding to the pairs of phase terminals of said rectifier transformer, a plurality of impulsing networks associated with the respective secondary phase-windings, each impulsing network including a capacitor connected in shunt with the phase winding, a reactor between the phase winding and the associated capacitor, circuit means for connecting the make-alive electrodes of two valves connected to a pair of phase terminals in series across the capacitor, a saturating reactor in series with the pair of make-alive electrodes to control the current flow from said capacitor to said pair of electrodes and rectifier devices in series and in shunt with each of said make-alive electrodes.

9. A control circuit for controlling a pair of make-alive type valves connected 180 electrical degrees apart comprising a make-alive electrode in each of the valves, a source of alternating current control potential, a capacitor connected across said source of potential, an impedance for controlling current flow from said source to said capacitor, a common cathode connection for said valves, means including said common cathode connection for connecting said make-alive electrodes in parallel opposition across said capacitor, a saturating reactor in series between said capacitor and said make-alive electrodes, a unidirectional conductor in series with each make-alive electrode and a second unidirectional conductor in shunt with said make-alive electrode and said first mentioned unidirectional conductor.

10. A vapor electric converter system comprising a main transformer providing a plurality of pairs of phase terminals, the terminals of each pair of terminals being separated by 180 electrical degrees, a make-alive-type valve connected to each of said phase terminals, a common cathode connection for all of said valves, a make-alive electrode in each of said valves, a source of polyphase alternating current control potential, means for shifting the phase relation of said control potential, means for providing a plurality of electrically insulated phase windings corresponding to said pairs of phase terminals, a capacitor connected across each of said phase windings, an impedance connected between each of the independent phase windings and the respective capacitor, means for connecting the opposite sides of the respective capacitors to the make-alive electrodes of the valves connected to corresponding pairs of phase terminals, a saturating reactor for controlling the flow of current from said capacitor to said make-alive electrodes, a plurality of rectifier elements connected in conductive relation from the cathode connection to each make-alive electrode, said capacitor connection being made intermediate the rectifier elements.

11. In a make-alive type converter having a supply transformer and at least a pair of make-alive type valves connected to opposed phase terminals of said transformer, a control system comprising a make-alive electrode in each of said valves, a source of alternating make-alive potential, a capacitor charged from said source, a linear reactor for controlling the flow of current from said source to said capacitor, means for connecting said make-alive electrodes in series across said capacitor, a saturating reactor for controlling the flow of current from said capacitor through said make-alive electrodes, and a constant potential network interposed between said source and said capacitor.

12. An electric converter system comprising a main transformer providing a plurality of pairs of phase terminals, the terminals of each pair of phase terminals being separated by 180 electrical degrees, a make-alive type valve connected to each of said phase terminals, a common cathode connection for all of said valves, a make-alive electrode in each of said valves, a source of polyphase alternating current control potential, phase shifting means for said control potential, means for providing a plurality of electrically insulated phase windings corresponding to said pairs of phase terminals, a plurality of wave-shape-transformer circuits associated with the respective phase winding, each circuit including a capacitor connected across said phase winding, an impedance connected between the phase winding and the respective capacitor, means for connecting the opposite sides of the capicitor to the make-alive electrodes of the valves connected to corresponding pairs of phase terminals, a saturating reactor for controlling the flow of current from said capacitor to said make-alive electrodes and a constant potential network between said source of control potential and said capacitor.

13. A control circuit for controlling a pair of make-alive-type valves connected 180 electrical degrees apart comprising a make-alive electrode in each of the valves, a source of alternating current control potential, a capacitor connected across said source of potential, a resistor for controlling current flow from said source to said capacitor, a common cathode connection for said valves, means including said common cathode connection for connecting said make-alive electrodes in parallel opposition across said capacitor, a saturating reactor in series between said capacitor and said make-alive electrodes and unidirectional conductors in shunt with each of said make-alive electrodes.

14. In a make-alive type converter having a supply transformer and at least a pair of make-alive type valves connected to opposed phase terminals of said transformer, a control system comprising a make-alive electrode in each of said valves, a source of alternating make-alive potential, a capacitor charged from said source, a linear reactor for controlling the flow of current to said capacitor, means including a common cathode connection for connecting said make-alive electrodes in parallel opposition across said capacitor, a saturating reactor for controlling the flow of current from said capacitor through said make-alive electrodes a plurality of copper oxide rectifier elements connected in conductive relation between the common cathode and each of the make-alive electrodes, said capacitor being connected intermediate said rectifier elements and a compensating resistor in series between said capacitor and said rectifier elements.

15. In an electric current conversion system including a plurality of make-alive type electric valves each having a main anode and a cathode, a control system comprising a make-alive electrode in each of said valves, a source of alternating control potential, impulsing means for supplying periodic impulses from said source to said make-alive electrodes, a plurality of local circuits including a plurality of unidirectional conducting devices between the cathode of each of said valves and its cooperating make-alive electrode, said unidirectional conductors being conductive from the cathode to the make-alive electrode, an auxiliary source of potential and transformer means for impressing potential from said auxiliary source on said local circuits.

16. An electric conversion system comprising a main transformer providing a plurality of pairs of phase terminals, the terminals of said pairs being separated by 180 electrical degrees, a make-alive-type valve connected to each of said phase terminals, a common cathode connection for all of said valves, a make-alive electrode in each of said valves, a source of alternating current control potential, phase shifting means for said control potential, means for providing a plurality of electrically insulated phase windings corresponding to said pairs of phase terminals, a capacitor connected across each of said independent phase windings, impedances connected between the independent phase windings and the respective capacitors, means for connecting the opposite sides of the respective capacitors to the make-alive electrodes of the valves connected to corresponding pairs of phase terminals, a saturating reactor for controlling the flow of current from said capacitor to said make-alive electrodes, a plurality of rectifier elements connected in conductive relation from the common cathode to each of the make-alive electrodes, said capacitor connection being made intermediate the rectifier elements, an auxiliary source of alternating potential and transformer means for impressing potential from said auxiliary source on the local circuits including the make-alive electrode and the rectifier elements connected between the cathode connection and the make-alive electrodes, the auxiliary potential impressed on said local circuits being of a value lower than that required to initiate make-alive action independent of the potential received through the saturating reactor.

17. In a make-alive type converter having a supply transformer and at least a pair of make-alive type valves connected to opposed phase terminals of said transformer, a control system comprising a make-alive electrode in each of said valves, a source of alternating make-alive potential, a capacitor charged from said source, an impedance for controlling the flow of current from said source to said capacitor, means including a unidirectional conductor in series with each make-alive electrode and a unidirectional conductor in shunt with each make-alive electrode and its associated series connected unidirectional conductor for connecting said make-alive electrodes in parallel across said capacitor and a saturating reactor for controlling the flow of current from said capacitor to said make-alive electrodes.

18. In combination, a source of alternating current, a pair of output circuits, apparatus energized from said source for producing an alternating voltage of peaked wave form comprising a saturable inductive reactance and a capacitive reactance, the inductive reactance when not saturated having a value which is substantially greater than the capacitive reactance during both the positive and negative half cycles of voltage of said source so that peaks of voltage are produced when the inductive reactance saturates, a stabilizing resistance connected in circuit with said capacitive reactance and said inductive reactance in order to maintain symmetrical the positive and negative peaks of the alternating voltage of peaked wave form, and means comprising a pair of oppositely poled unidirectional conducting devices having a common juncture connected between said output circuits and said capacitive resistance and said inductive resistance to supply positive impulses of voltage to said output circuits.

19. In combination, an alternating current circuit, a load circuit, electric translating apparatus connected between said circuits and comprising an electric valve means having an anode, a cathode, an immersion-ignitor control member, and employing an ionizable medium capable of supporting an arc discharge, a source of alternating current including a pair of supply conductors, an excitation circuit energized from said source and including a saturable inductive device and a capacitance which constitute a circuit which is nonlinearly resonant to the magnitude of the voltage of said source, means for connecting said capacitance across said conductors to establish a charging circuit for said capacitance, means for connecting said inductive device and the cathode-to-control member circuit of said electric valve means in series with said capacitance to form a discharge circuit for said capacitance, the inductive device when not saturated having an inductive reactance which is substantially greater than the capacitive reactance of the excitation circuit so that an impulse of voltage is impressed on said control member when the inductive device saturates.

20. In combination, an alternating current circuit, a load circuit, electric translating apparatus connected between said circuits and comprising a pair of electric discharge paths each having an anode, a cathode and a control member, a source of alternating current, an excitation circuit energized from said source for rendering said discharge paths conductive alternately and comprising a capacitance connected to be charged from said source during each half cycle of voltage thereof, a circuit for discharging said capacitance comprising in series the cathode-to-control member circuits of said electric discharge paths and a saturable inductive device which is saturable on both half cycles of voltage of said source to cause abrupt increases in the discharge current of said capacitance, and unidirectional-conducting means connected in said discharge circuit to energize the cathode-to-control-member circuits of said electric discharge paths selectively with the impulses of discharge current produced during half cycles of voltage of opposite polarity.

21. In combination, an alternating current circuit, a load circuit, electric translating apparatus connected between said circuits and comprising a pair of electric discharge paths each having an anode, a cathode and a control member and employing an ionizable medium capable of supporting an arc discharge, a source of alternating current, an excitation circuit energized from said source for rendering said discharge paths conductive alternately and comprising a capacitance connected to be charged from said source during each half cycle of voltage thereof, a circuit for discharging said capacitance comprising in series the cathode-to-control-member circuits of said electric discharge paths and a saturable inductive device which is saturable on both half cycles of voltage of said source to cause abrupt increases in the discharge current of said capacitance, unidirectional conducting means connected in said discharge circuit to energize the control members selectively with impulses of unidirectional current produced during half waves of voltage of opposite polarity.

22. A make-alive control-system comprising a pair of alternately conducting valve-devices: an alternating-current source therefor; an inductance-device having a saturable core; a capacitor; a pair of series asymmetrically conducting devices; a pair of shunting asymmetrically conducting devices; circuit-means including said alternating-current source for impressing upon said capacitance an alternating voltage having substantially equal positive and negative impulses; circuit-means, including said capacitor, for impressing upon said inductance-device an alternating voltage having substantially equal positive and negative impulses, in such magnitude as to saturate the inductance-device at a portion of each of the positive and negative impulses; make-alive circuit-means, including said series asymmetrically conducting devices, for utilizing said inductance-device to cause peaked positive current-impulses to be supplied to a make-alive electrode of each of said valve-devices; and a shunting circuit, including said shunting asymmetrically conducting device, connected in shunt-circuit relation around each make-alive electrode and its series asymmetrically conducting device, whereby a path is provided for the peaked negative current-impulses.

23. A make-alive control-system comprising a pair of alternately conducting valve-devices: an alternating-current source therefor; an inductance-device having a saturable core; a capacitor; an auxiliary impedance-device; a pair of series asymmetrically conducting devices; a pair of shunting asymmetrically conducting devices; circuit-means, serially including said alternating-current source and said auxiliary impedance-device, for impressing upon said capacitor an alternating voltage having substantially equal positive and negative impulses; circuit-means, including said capacitor, for impressing upon said inductance-device an alternating voltage having substantially equal positive and negative impulses, in such magnitude as to saturate the inductance-device at a portion of each of the positive and negative impulses; make-alive circuit-means, including said series asymmetrically conducting devices, for utilizing said inductance-device to cause peaked positive current-impulses to be supplied to a make-alive electrode of each of said valve-devices; and a shunting circuit, including said shunting asymmetrically conducting device, connected in shunt-circuit relation around each make-alive electrode and its series asymmetrically conducting device, whereby a path is provided for the peaked negative current-impulses.

24. A vapor-electric converter-system, comprising a main polyphase transformer providing a plurality of diametrically opposite pairs of phase-terminals, a main valve of a make-alive type connected to each of said phase-terminals, each of said main valves including a make-alive electrode, a common cathode connection for all of said valves, a source of polyphase control-potential, auxiliary transformer-means energized from said control-potential source for providing a plurality of electrically insulated secondary phase-windings, a plurality of secondary networks associated with the respective secondary phase-windings, each secondary network comprising a capacitor, a first impedance-device and a second impedance-device, at least said second impedance-device being a saturable inductance device, the capacitor being connected in shunt relation to its associated phase-winding, with the first impedance-device connected in series-circuit relation therebetween, circuit means, including said second impedance-device for connecting the opposite terminals of each capacitor to the make-alive electrodes of the two main valves which are connected to one of said pairs of phase-terminals and unidirectional conducting means in shunt with each make-alive electrode for providing a return connection to said capacitor.

25. In combination, an alternating current supply circuit, an output circuit having a resistance and a resultant reactance of predetermined sign, and phase shifting means connected between said supply circuit and said output circuit and comprising a variable reactance element having a reactance of a sign corresponding to that of said output circuit and means connected across said output circuit for maintaining the magnitude of the voltage impressed thereacross substantially constant for different values of phase displacement of said output voltage relative to the voltage of said supply circuit occasioned by variations in the magnitude of said variable impedance and comprising a net reactance of a sign opposite to that of said output circuit.

26. In combination, a source of alternating current, an output circuit having a resistance and net inductive reactance, and a phase shifting circuit connected between said source and said output circuit for controlling the phase of the voltage supplied to said output circuit and comprising a saturable inductive reactance including a winding connected in series relation with said source and said output circuit and a circuit connected across said output circuit having a net capacitive reactance greater than the inductive reactance of said output circuit.

27. In combination, an alternating current supply circuit, an output circuit having a resistance and a net inductive reactance, and phase shifting means connected between said supply circuit and said output circuit for shifting the phase of the voltage applied to said output circuit and comprising a variable inductive reactance having a winding connected in series relation with said supply circuit and said output circuit, said resistance of said output circuit constituting with said inductive reactance a phase shifting network and a capacitive circuit connected across said output circuit for maintaining the voltage impressed across said output circuit substantially constant for a range of different phase displacements of the output voltage determined by different values of said inductive reactance.

28. In combination, an electric valve means comprising a control member, an excitation circuit connected to said control member, an alternating current supply circuit, and phase shifting means connected between said excitation circuit and said supply circuit and comprising a saturable inductive device having a winding connected in series relation with said excitation circuit, the resistance of said excitation circuit and the inductive reactance of said device constituting a phase shifting network and a circuit connected between said device and said excitation circuit and comprising a capacitance the capacitive reactance of which is greater than the inductive reactance of said excitation circuit.

29. In combination, an electric valve means having a control member, an excitation circuit connected to said control member the impedance of said excitation circuit comprising a resistance component and an inductive reactance component, an alternating current supply circuit, and phase shifting means connected between said supply circuit and said excitation circuit and including a saturable inductive device comprising a winding connected in series relation with said supply circuit and said excitation circuit and a circuit connected between said device and said excitation circuit and having a capacitive reactance substantially greater than the inductive reactance of said excitation circuit for maintaining the voltage applied to said excitation circuit substantially constant in magnitude for a predetermined range in phase shift occasioned by variations in the magnitude of the reactance of said device.

30. In combination, an electric valve means having a control member, an excitation circuit connected to said control member, the impedance of said excitation circuit comprising a resistance component and a net inductive reactance component, an alternating current supply circuit, and phase shifting means connected between said supply circuit and said excitation circuit and comprising a saturable inductive device having a winding connected in series relation with said excitation circuit, the inductive reactance of said device constituting with the resistance of said excitation circuit a phase shifting network, and means connected between said winding and said excitation circuit for maintaining the magnitude of the voltage supplied to said excitation circuit substantially constant for a range of different phase displacements of the voltage applied to said excitation circuit occasioned by variations in the magnitude of the inductive reactance of said device.

31. In combination, an alternating current supply circuit, a load circuit, a control circuit for transmitting an impulse of current to said load circuit comprising a capacitance, a circuit including a substantially linear inductive reactance connecting said capacitance and said source, said inductive reactance providing means for controlling the transfer of current between said capacitance and said source, a saturable nonlinear inductive reactance arranged to saturate within the normal range of operating current of said load circuit, means connecting said nonlinear inductive reactance and said load circuit in series and to said capacitance to establish a discharge circuit therefor, said nonlinear inductive reactance being symmetrically saturable with respect to the magnitude of the current transmitted thereto to supply an impulse of current to at least a portion of said load circuit during each half cycle of voltage of said alternating current supply circuit.

32. In combination, a source of alternating current, an output circuit having a resistance and a net inductive reactance, and a phase shifting circuit connected between said source and said output circuit for controlling the phase of the voltage supplied to said output circuit and comprising a variable inductive reactance including a winding connected in series relation with said source and said output circuit, means for varying the magnitude of said last-mentioned inductive reactance, and a circuit connected across said output circuit having a net capacitative reactance of such magnitude that the current transmitted to said circuit and said output circuit through said variable inductive reactance maintains the voltage impressed on said output circuit substantially constant for different values of said variable inductive reactance.

WILLIAM E. PAKALA.
HENRY C. MYERS.

REFERENCES CITED

The following references are of record in the file of this patent:

UNITED STATES PATENTS

| Number | Name | Date |
|---|---|---|
| 2,190,775 | Edwards | Feb. 20, 1940 |
| 2,248,626 | Herskind | July 8, 1941 |
| 2,266,714 | Mittag | Dec. 16, 1941 |
| 2,267,398 | Edwards et al. | Dec. 23, 1941 |